US 7,479,002 B2

(12) United States Patent
Weiss

(10) Patent No.: US 7,479,002 B2
(45) Date of Patent: Jan. 20, 2009

(54) LOCKING SYSTEM FOR A COTTON CANDY MACHINE

(75) Inventor: Ronald R. Weiss, Okeana, OH (US)

(73) Assignee: Gold Medal Products Company, Cincinnati, OH (US)

( * ) Notice: Subject to any disclaimer, the term of this patent is extended or adjusted under 35 U.S.C. 154(b) by 190 days.

(21) Appl. No.: 11/622,706

(22) Filed: Jan. 12, 2007

(65) Prior Publication Data
US 2008/0171098 A1 Jul. 17, 2008

(51) Int. Cl.
A23G 3/02 (2006.01)
(52) U.S. Cl. .................. 425/9; 264/8; 425/8; 426/517
(58) Field of Classification Search .............. 425/8, 425/9, 72.2, 378, 379.1, 382.2, 382.3; 426/515, 426/516, 517; 264/8
See application file for complete search history.

(56) References Cited
U.S. PATENT DOCUMENTS 1,489,342 A * 4/1924 Brent .................... 425/9
3,036,532 A * 5/1962 Bowe .................... 425/9
4,293,292 A * 10/1981 Israel .................... 425/9
4,872,821 A 10/1989 Weiss
5,145,687 A 9/1992 Parker
5,441,754 A 8/1995 Evans, Sr.
5,498,144 A 3/1996 Francis et al.
5,520,859 A * 5/1996 Bogue et al. ............ 264/8
5,766,643 A 6/1998 Hammon
6,284,164 B1 9/2001 Weiss
6,585,504 B2 7/2003 Weiss
6,722,869 B2 * 4/2004 Todokoro ................ 425/9
2005/0011366 A1 * 1/2005 Kowalski et al. .......... 99/331

* cited by examiner

Primary Examiner—Yogendra Gupta
Assistant Examiner—Emmanuel S Luk
(74) Attorney, Agent, or Firm—Wood, Herron & Evans, LLP

(57) ABSTRACT

A locking system for a cotton candy machine includes a pair of rotatable cam members that are selectively engagable and disengagable from a motor mount of the machine to alternatively lock and unlock the machine. A rotatable handle or a pair of rotatable levers are operatively connected to the cam members to selectively rotate the cam members to the locked and unlocked positions.

15 Claims, 7 Drawing Sheets

LOCKING SYSTEM FOR A COTTON CANDY MACHINE

FIELD OF THE INVENTION

The present invention relates generally to cotton candy machines and, more particularly, to locking systems used in connection with cotton candy machines to lock the machines for safe transport and unlock the machines prior to use.

BACKGROUND OF THE INVENTION

Machines for spinning granular sugar into sugar filaments or so-called cotton candy are known and have been employed for some time to produce cotton candy. One known cotton candy machine, designated by numeral 10 in FIGS. 1, 2A and 2B, includes a base 12, a motor 14 housed within the base 12, and a spinner head 16 connected to the motor 14 through a rotatable shaft (not shown). Controls 18 are provided on a front panel 20 of the base 12 for controlling operation of the machine 10 as will be understood by those of ordinary skill in the art. A pair of handles 22 are mounted on opposite sides of the machine 10 so that a user can carry or transport the machine 10 to different locations.

In use, granular sugar is introduced into the spinner head 16 which includes heating elements and the like for melting the granular sugar. The rotation of the spinner head 16 causes the melted granular sugar to be spun out of holes or slots 24 in the spinner head 16 and onto the inner surface of a bowl or basket 26 (shown in phantom) mounted to the base 12 of the cotton candy machine 10. The sugar filaments adhered to the basket 26 may then be transferred to a paper tube or the like by rolling one end of the tube about the circumference of the basket to collect the cotton candy on the tube end.

In one type of cotton candy machine, the motor 14 of machine 10 is connected to a motor mount 28. The motor mount 28 includes a motor mounting wall 30, a depending skirt wall 32 and a radially outwardly directed flange 34 at its lower end. The upper end of the motor 14 is connected to the wall 30 of the motor mount 28 though multiple circumferentially spaced fasteners 36.

To reduce undesirable vibration of the cotton candy machine 10 during operation of the motor 14 to spin the spinner head 16, the motor mount 28 is suspended from a top wall 38 of the base 12 through multiple circumferentially spaced springs 40. The springs 40 are connected to and positioned between the top wall 38 of the base 12 and the radially outwardly directed flange 34 of the motor mount 28 as shown in FIGS. 2A and 2B so that the motor mount 28 is able to float relative to the base 12 during operation of the cotton candy machine 10. In this way, vibrational forces generated by the motor 14 during use of the cotton candy machine 10 are not imparted to the base 12 of the machine. This helps to reduce vibrational noise and unwanted movement of the machine 10 during the production of cotton candy.

In the past, a locking system 42 as shown in FIGS. 2A and 2B has been provided to enable a user to lock the cotton candy machine 10 for safe transport of the machine to different locations. The locking system 42 is provided to rigidly support or lock the motor mount 28 relative to the base 12 when the cotton candy machine 10 is transported so that the motor 14 and motor mount 28 will not be jostled against the base 12. Prior to use, the cotton candy machine 10 is unlocked through operation of the locking system 42 so that the motor mount 28 is again suspended by the springs 40 to float relative to the base 12.

As shown in FIGS. 2A and 2B, the locking system 42 includes a pair of threaded screws 44 that are each mounted to a fixed bracket 46. Each threaded screw 44 is also connected to a movable bracket 48 and a threaded knob 50. To unlock the cotton candy machine 10 as shown in FIG. 2A, the user turns the threaded knobs 50 in one direction so that the movable brackets 48 are lowered and disengaged from the radially outwardly directed flange 34 as shown in FIG. 2A. In the unlocked position as shown in FIG. 2A, the motor mount 28 is suspended by the springs 40 so that it, and motor 14 supported thereby, float relative to the base 12.

Prior to transport of the cotton candy machine 10, the user locks the machine 10 as shown in FIG. 2B by turning the threaded knobs 50 in an opposite direction so that the movable brackets 48 are raised and engage the radially outwardly directed flange 34. As the user continues to turn the threaded knobs 50 to lock the machine 10, the movable brackets 48 continue to move upwardly and urge the motor mount 28 upwardly to compress the springs 40. In the locked position of the machine 10 as shown in FIG. 2B, the motor mount 28 is rigidly supported or locked relative to the base 12.

While the locking system 42 provides for safe transport of the cotton candy machine 10, the locking system 42 requires coordinated manipulation of the threaded knobs 50 by the user to lock and unlock the machine 10. Also, the locking system 42 is not configured to prevent a user from inadvertently transporting the machine 10 in an unlocked position or attempting to operate the machine while it is in the locked position. Either of these conditions could result in damage to the machine 10.

Accordingly, there is a need for an improved locking system for cotton candy machines that is easily manipulated by the user to lock and unlock the cotton candy machine.

There is also a need for an improved locking system for cotton candy machines that prevents a user from inadvertently transporting the machine in an unlocked position or attempting to operate the machine while it is in the locked position.

SUMMARY OF THE INVENTION

The present invention overcomes the foregoing and other shortcomings and drawbacks of locking systems for cotton candy machines heretofore known. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, a cotton candy machine is provided with a base, a spinner head for heating and spinning cotton candy from sugar introduced into the spinner head and a motor for rotating the spinner head to direct molten sugar filaments radially outwardly from the spinner head. A motor mount is operatively connected to the base and is configured to support the motor. The motor mount is selectively positionable in locked position and unlocked positions.

In accordance with one aspect of the present invention, the cotton candy machine includes a rotatable locking member that is configured to position the motor mount in the locked and unlocked positions in response to selective rotation of the locking member. In one embodiment, the locking member comprises a pair spaced apart and opposing cam members.

A rotatable actuator, such as a handle, is operatively connected to each of the cam members. As the handle is rotated between a raised position and a lowered position, the cam members are rotated to alternatively lock and unlock the cotton candy machine.

In the unlocked position, the handle is rotated downwardly so that the cam members disengage from the motor mount. The handle is positioned so as to permit a user to mount the basket to the base for use of the machine.

Prior to transport of the cotton candy machine, the user locks the machine by rotating the handle upwardly. As the handle is rotated upwardly, the cam members rotate into engagement with the motor mount to lock the machine. In one embodiment, a portion of the handle extends over the spinner head when the machine is locked and thereby prevents a user from mounting the basket to the machine. In this way, the user is prevented from inadvertently operating the machine while it is in the locked position. The handle also provides the user with an ergonomic means for carrying the machine between different locations.

In an alternative embodiment, the handle is replaced with a pair of rotatable levers that are each operatively connected to a respective one of the pair of cam members. As the levers are rotated between a raised position and a lowered position, the cam members are rotated to alternatively lock and unlock the cotton candy machine.

These and other objects and advantages of the present invention will be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION OF THE PREFERRED EMBODIMENTS

Figure 1:
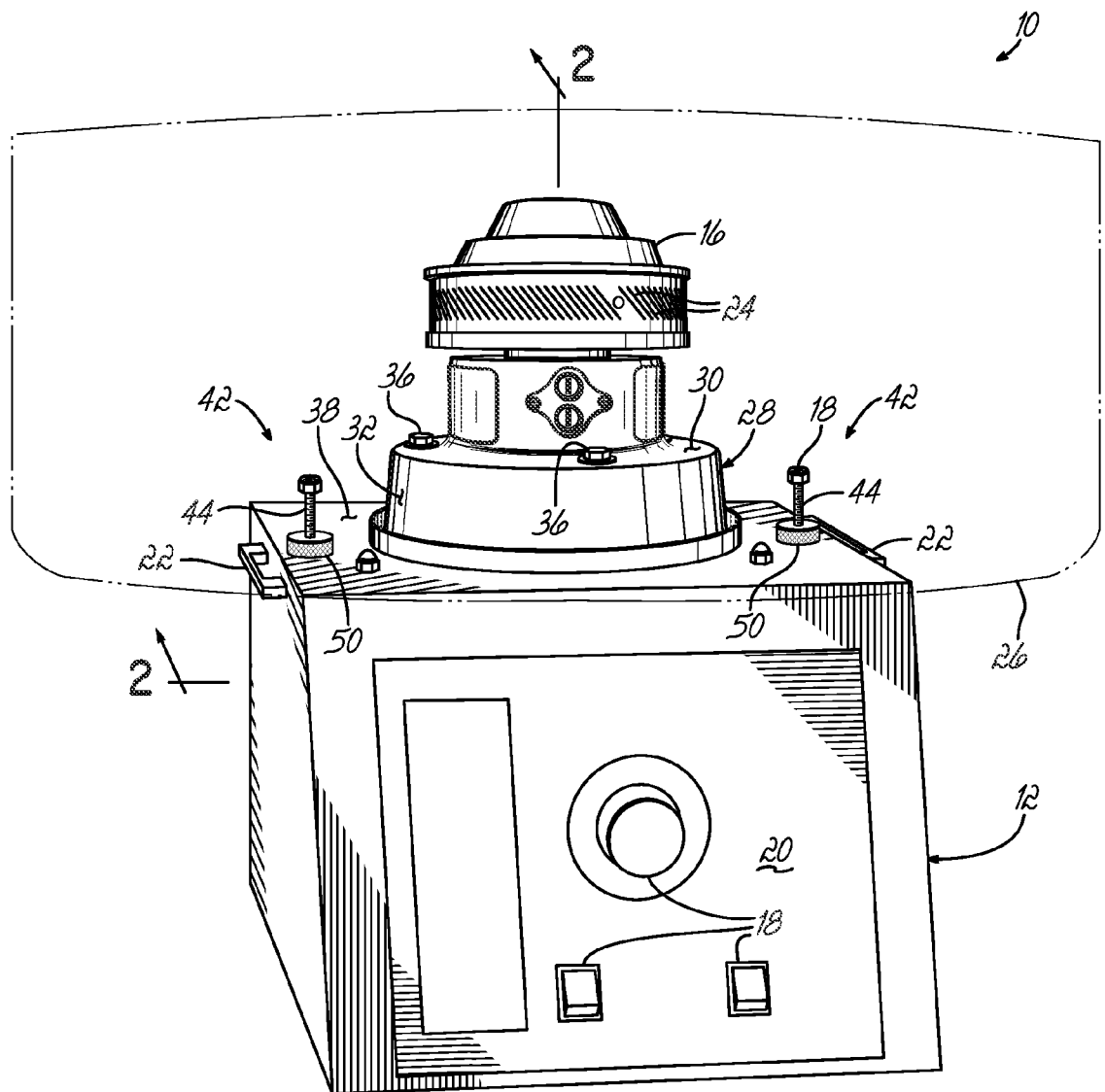
FIG. 1 is a perspective view of a cotton candy machine including a locking system of the prior art for locking and unlocking the cotton candy machine.
Figure 2A:
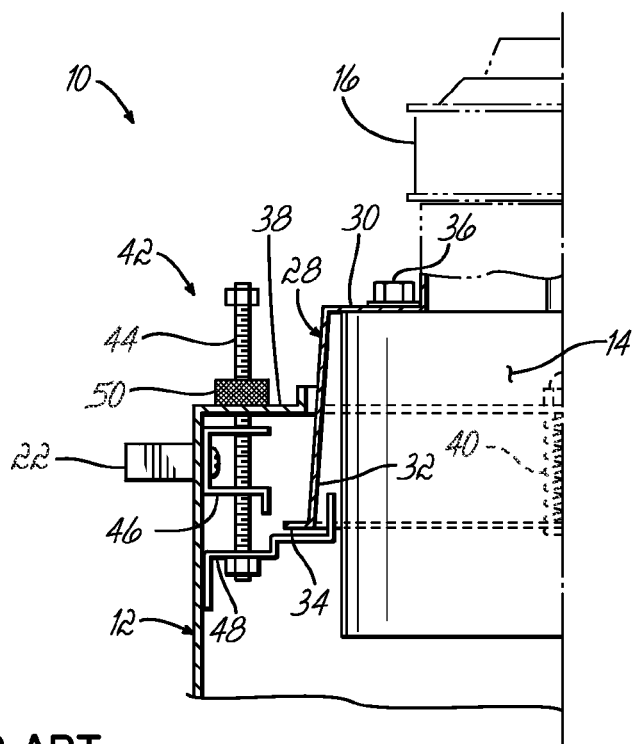
FIG. 2A is a partial cross-sectional view of the cotton candy machine shown in FIG. 1, illustrating the locking system positioned to unlock the cotton candy machine.
Figure 2B:
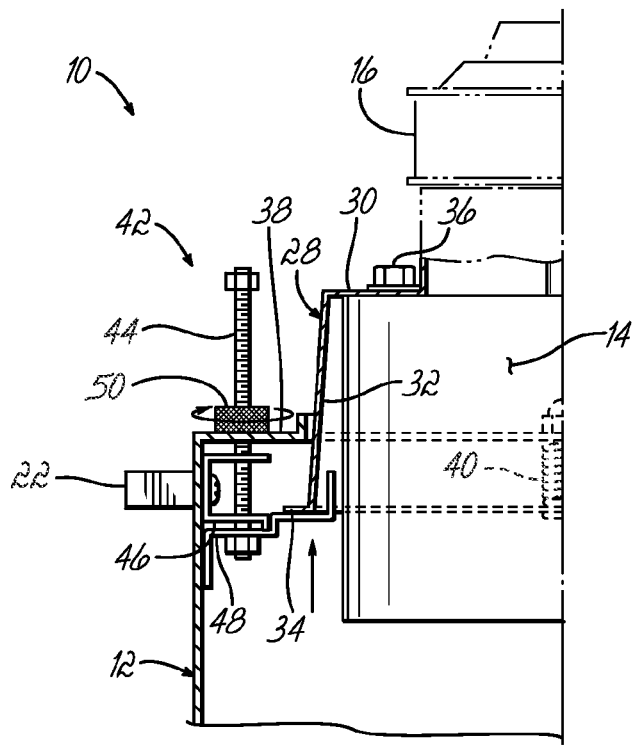
FIG. 2B is a view similar to FIG. 2A, illustrating the locking system positioned to lock the cotton candy machine.
Figure 3:
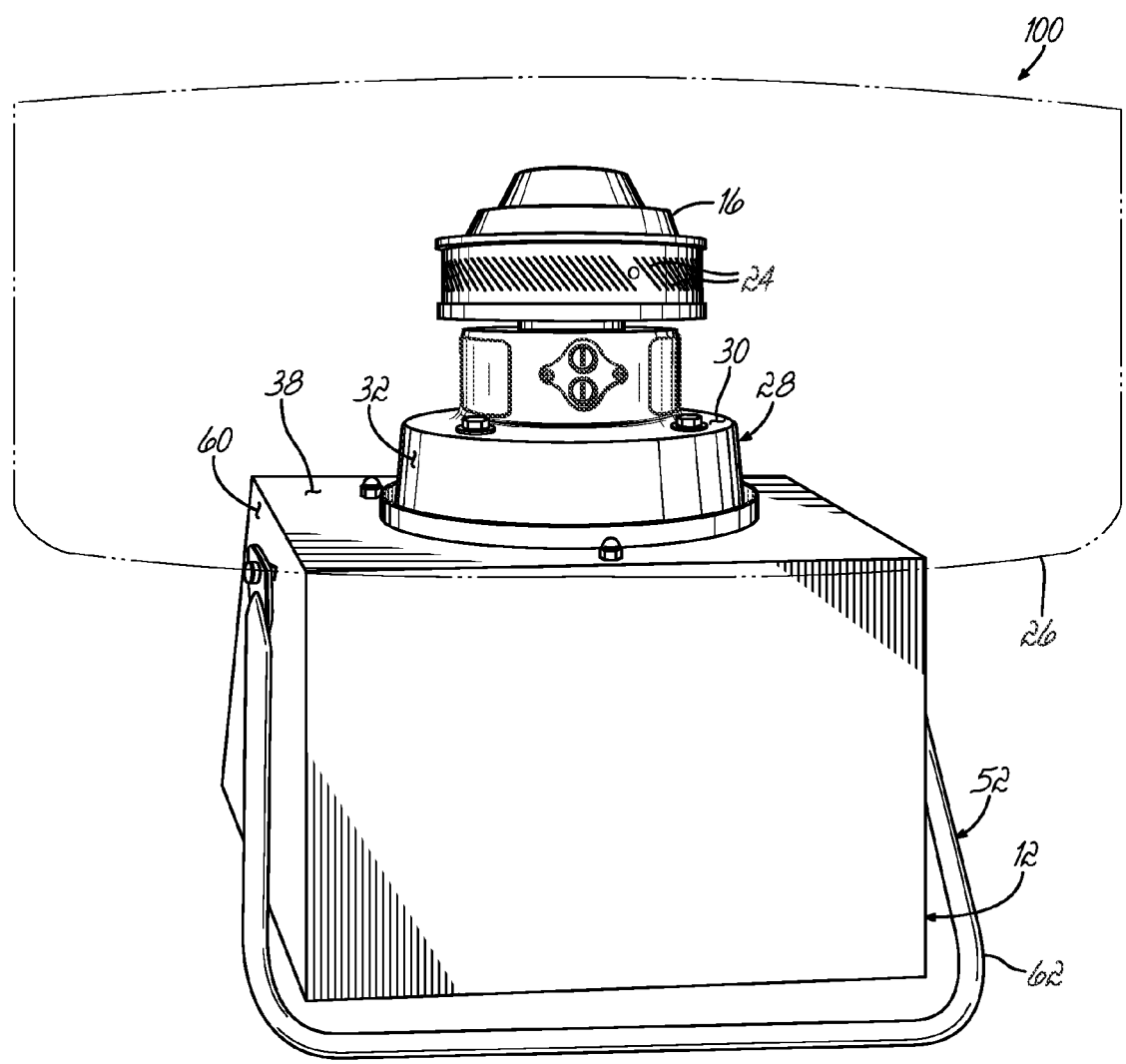
FIG. 3 is a rear perspective view of a cotton candy machine including a locking system in accordance with one embodiment of the present invention, illustrating the locking system positioned to unlock the cotton candy machine.
Figure 3A:
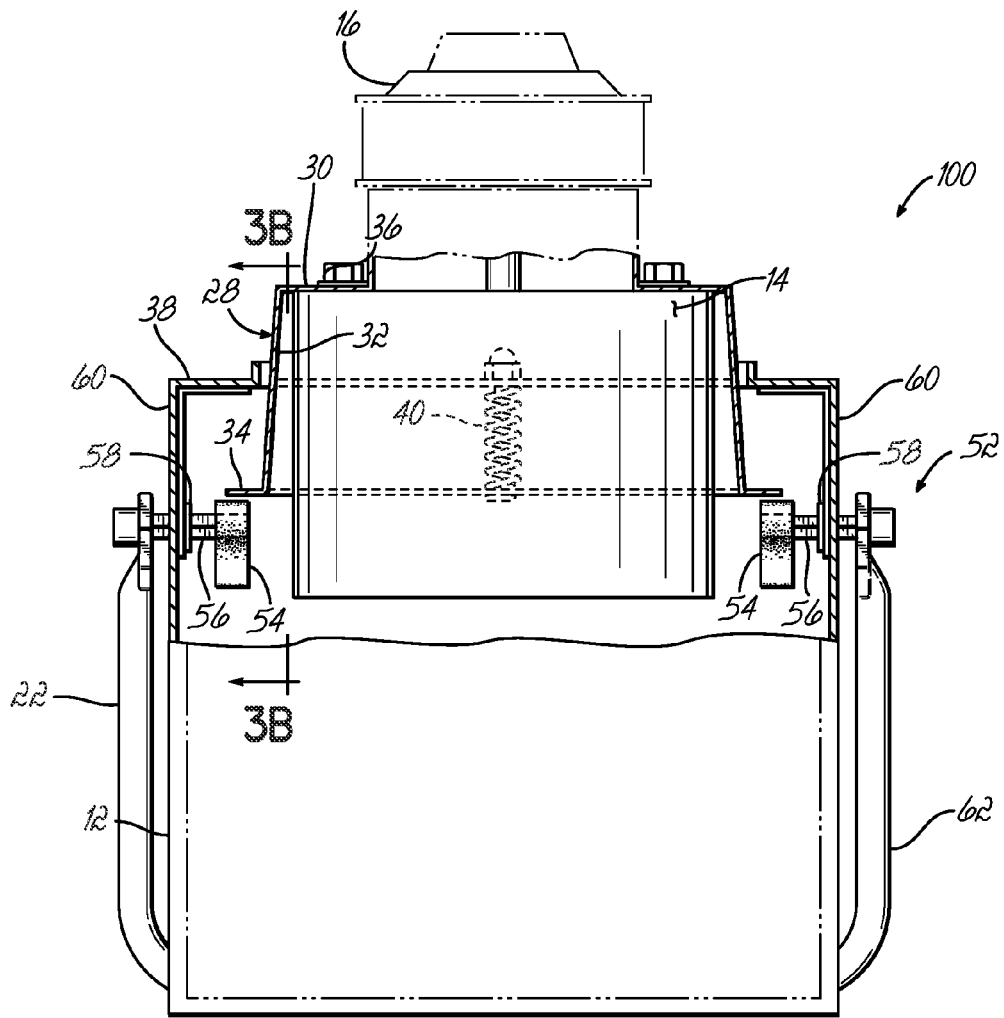
FIG. 3A is a front elevational view, partially in cross-section, of the cotton candy machine shown in FIG. 3, illustrating the locking system positioned to unlock the cotton candy machine.
Figure 3B:
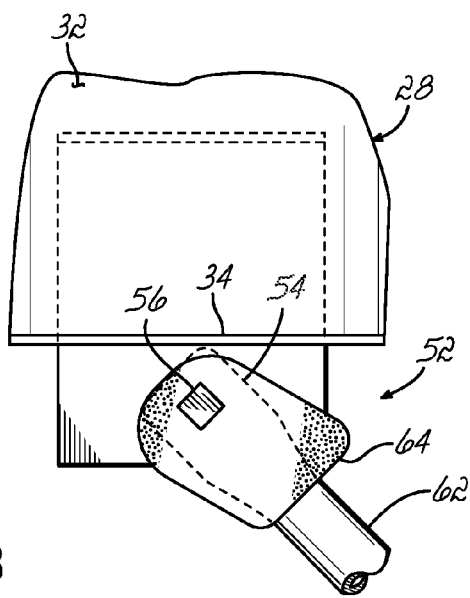
FIG. 3B is a cross-sectional view taken along line 3B-3B of FIG. 3A.
Figure 4:
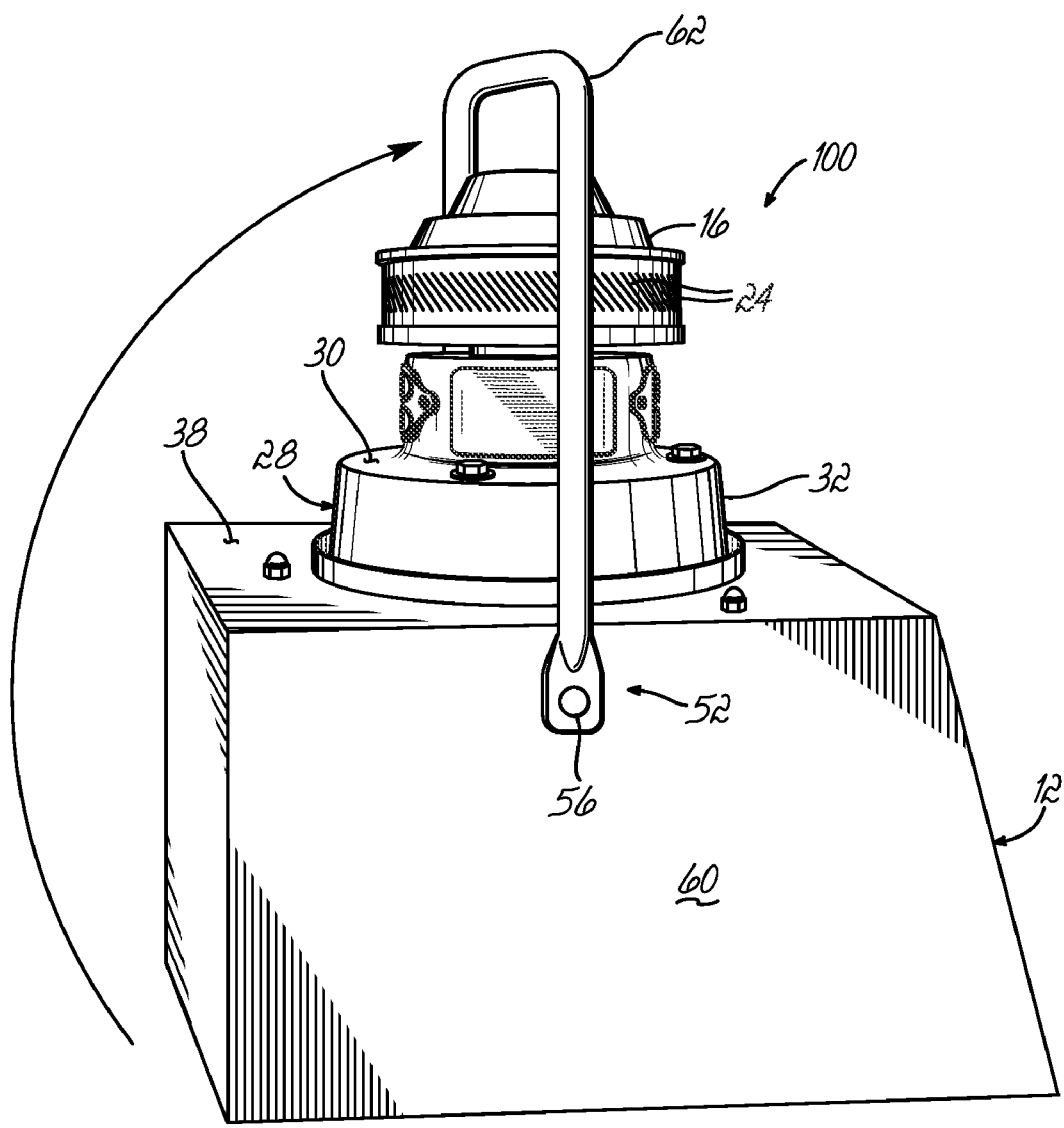
FIG. 4 is a side perspective view of the cotton candy machine shown in FIG. 3, illustrating the locking system positioned to lock the cotton candy machine.
Figure 4A:
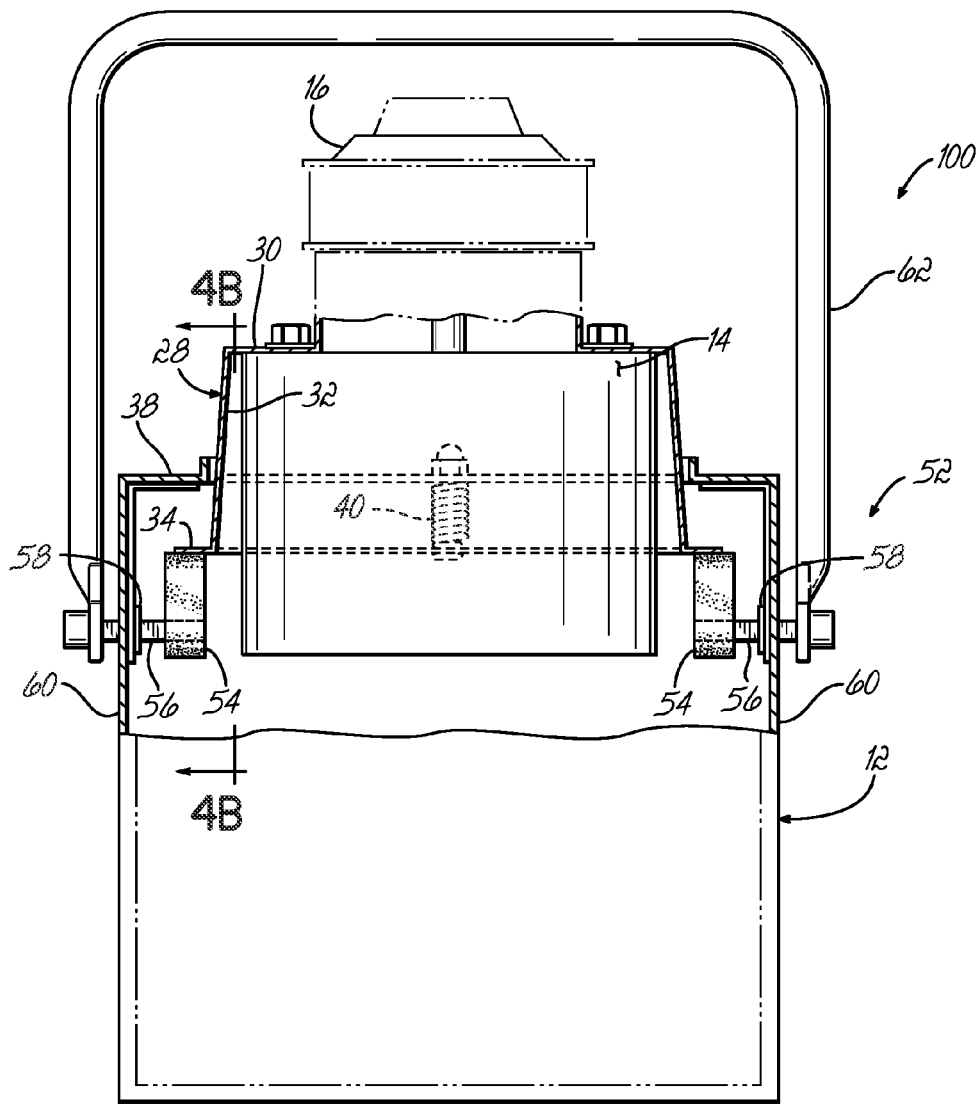
FIG. 4A is a front elevational view, partially in cross-section, of the cotton candy machine shown in FIG. 4, illustrating the locking system positioned to lock the cotton candy machine.
Figure 4B:
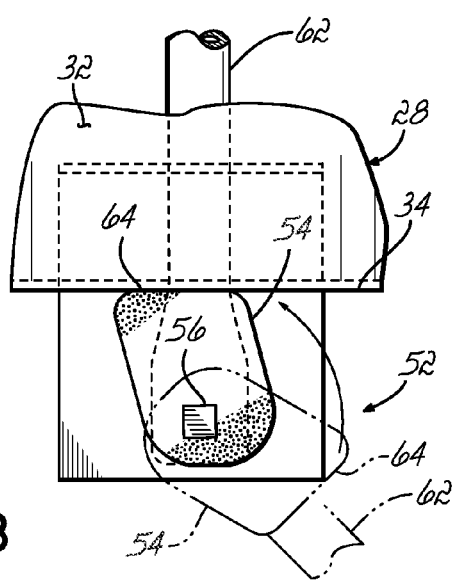
FIG. 4B is a cross-sectional view taken along line 4B-4B of FIG. 4A.

Referring now to FIGS. 3, 3A, 3B, 4, 4A and 4B, a locking system 52 is shown for locking and unlocking a cotton candy machine 100 in accordance with one embodiment of the present invention, where like numerals represent like parts to the cotton candy machine 10 shown in FIGS. 1, 2A and 2B. The locking system 52 is provided to lock the motor mount 28 in a locked position (FIGS. 4, 4A and 4B) for safe transport of the cotton candy machine 100 and unlock the motor mount 28 prior to use of the machine 100 (FIGS. 3, 3A and 3B). In the unlocked position as shown in FIG. 3A, the motor mount 28 is suspended from the top wall 38 of the base 12 by the springs 40 so that the motor mount 28, and the motor 14 supported thereby, float relative to the base 12. In the locked position as shown in FIGS. 4, 4A and 4B, the motor mount 28 is rigidly supported or locked relative to the base 12.

In one embodiment, as shown in FIGS. 3A and 3B, the locking system 52 includes a pair of spaced apart and opposing cam members 54 that are each rotatably connected to an inner end of a rotatable shaft 56. As shown in FIG. 3A, each of the shafts 56 is supported in a bearing 58 provided in a respective side wall 60 of the base 12. The locking system 52 further includes a rotatable handle 62 that is connected or keyed to an outer end of each of the shafts 56. In one embodiment, the handle 62 is generally U-shaped, although other shapes of the handle 62 are possible as well. As the handle 62 is rotated between a raised position (FIGS. 4, 4A and 4B) and a lowered position (FIGS. 3, 3A and 3B), the cam members 54 are rotated to alternatively lock and unlock the cotton candy machine 100 as described in greater detail below.

In the unlocked position as shown in FIGS. 3, 3A and 3B, the handle 62 is rotated downwardly so that the cam members 54 disengage from the motor mount 28. In the unlocked position of the cotton candy machine 100, the motor mount 28 is suspended by the springs 40 so that it, and motor 14 supported thereby, float relative to the base 12. As shown in FIGS. 3 and 3A, the handle 62 is positioned so as to permit a user to mount the basket 26 to the base 12 for use of the machine 100.

Prior to transport of the machine 100, the user locks the machine 100 by rotating the handle 62 upwardly as shown in FIGS. 4, 4A and 4B. As the handle 62 is rotated upwardly, the cam members 54 rotate into engagement with the radially outwardly directed flange 34 of the motor mount 28 and lift the motor mount 28 to compress the springs 40. In the fully raised position of the handle 62, a flattened surface 64 of each cam member 54 is brought into engagement with the radially outwardly directed flange 34 of the motor mount 28 to lock the cotton candy machine 100 in the locked position. In this locked position, a portion of the handle 62 extends over the spinner head 16 and thereby prevents a user from mounting the basket 26 to the machine 100. In this way, the user is prevented from inadvertently operating the machine 100 while it is in the locked position. The handle 62 also provides the user with an ergonomic means for carrying the machine 100 between different locations.

Figure 5:
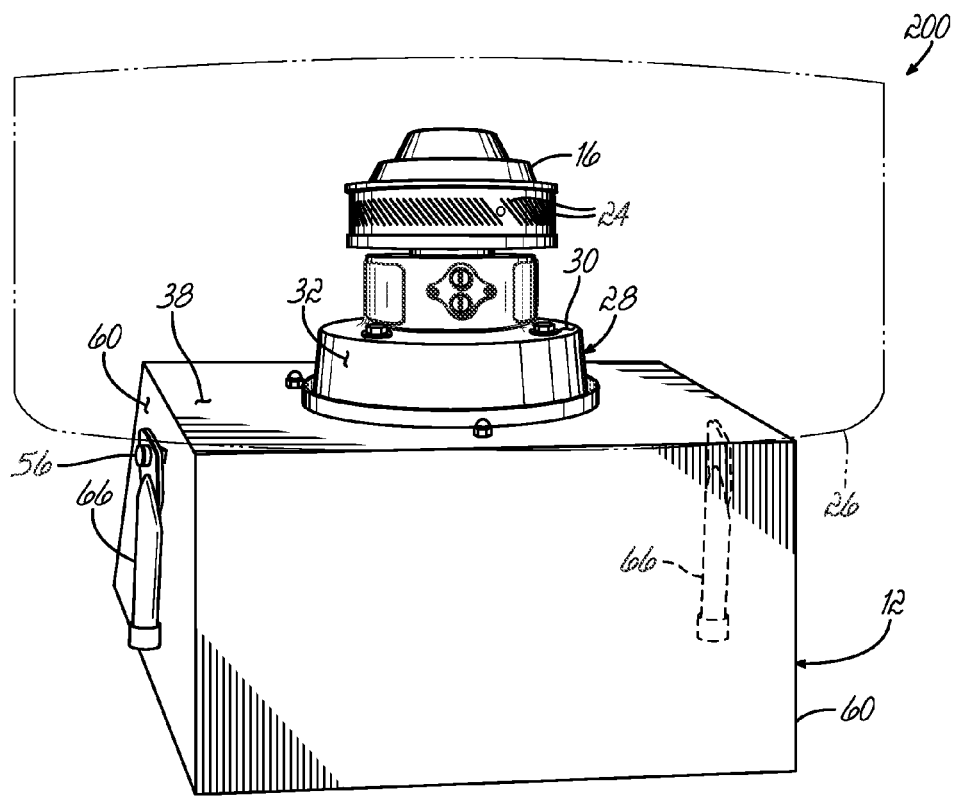
FIG. 5 is a rear perspective view of a cotton candy machine including a locking system in accordance with another embodiment of the present invention, illustrating the locking system positioned to unlock the cotton candy machine.
Figure 5A:
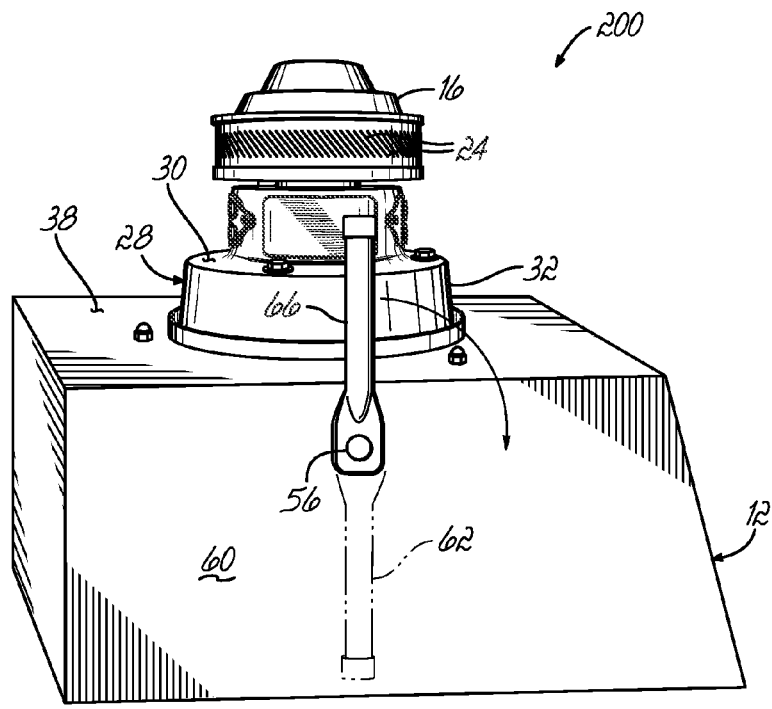
FIG. 5A is a side perspective view of the cotton candy machine shown in FIG. 5, illustrating the locking system positioned to lock the cotton candy machine.

In an alternative cotton candy machine 200 as shown in FIGS. 5 and 5A, the handle 62 is replaced with a pair of rotatable levers 66 that are each connected or keyed to a respective one of the shafts 56. As the levers 66 are rotated between a raised position (FIG. 5A) and a lowered position (FIG. 5), the cam members 54 are rotated to alternatively lock and unlock the cotton candy machine 200 as described in detail above in connection with cotton candy machine 100. In the unlocked position as shown in FIG. 5, the pair of levers 66 are positioned so as to permit a user to mount the basket 26 to the base 12 for use of the cotton candy machine 200. In the locked position as shown in FIG. 5A, the levers 66 extend upwardly above the top wall 38 of base 12 to prevent a user from mounting the basket 26 to machine 200. In this way, the user is prevented from inadvertently operating the machine 200 while it is in the locked position.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A cotton candy machine, comprising:
    a base;
    a spinner head for heating and spinning cotton candy from sugar introduced into the spinner head;
    a motor operatively connected to the spinner head for rotating the spinner head to direct molten sugar filaments radially outwardly from the spinner head;
    a motor mount operatively connected to the base and configured to support the motor, the motor mount being selectively positionable in a locked position and an unlocked position;
    a rotatable locking member configured to position the motor mount in the locked and unlocked positions in response to selective rotation of the locking member; and
    a rotatable actuator operatively connected to the locking member and selectively rotating the locking member so as to position the motor mount in the locked and unlocked positions.

2. The cotton candy machine of claim 1 wherein the rotatable actuator comprises a handle.

3. The cotton candy machine of claim 2 wherein a portion of the handle is disposed above the spinner head when the motor mount is selectively positioned in the locked position.

4. The cotton candy machine of claim 1 wherein the rotatable locking member comprises a cam.

5. The cotton candy machine of claim 1 further comprising a plurality of springs operatively connecting the base and the motor mount.

6. The cotton candy machine of claim 1 wherein the rotatable actuator comprises a handle.

7. A cotton candy machine, comprising:
    a base;
    a spinner head for heating and spinning cotton candy from sugar introduced into the spinner head;
    a motor operatively connected to the spinner head for rotating the spinner head to direct molten sugar filaments radially outwardly from the spinner head;
    a motor mount operatively connected to the base and configured to support the motor, the motor mount being selectively positionable in a locked position and an unlocked position;
    a pair of spaced apart and opposing rotatable locking members configured to position the motor mount in the locked and unlocked positions in response to selective rotation of the pair of locking members; and
    a common rotatable actuator operatively connected to the pair of locking member and selectively rotating the pair of locking members so as to position the motor mount in the locked and unlocked positions.

8. The cotton candy machine of claim 7 wherein the rotatable actuator comprises a handle.

9. The cotton candy machine of claim 8 wherein a portion of the handle is disposed above the spinner head when the motor mount is selectively positioned in the locked position.

10. The cotton candy machine of claim 7 wherein the rotatable locking member comprises a cam.

11. The cotton candy machine of claim 7 further comprising a plurality of springs operatively connecting the base and the motor mount.

12. A cotton candy machine, comprising:
    a base;
    a spinner head for heating and spinning cotton candy from sugar introduced into the spinner head;
    a motor operatively connected to the spinner head for rotating the spinner head to direct molten sugar filaments radially outwardly from the spinner head;
    a motor mount operatively connected to the base and configured to support the motor, the motor mount being selectively positionable in a locked position and an unlocked position;
    a pair of spaced apart and opposing rotatable cam members configured to position the motor mount in the locked and unlocked positions in response to selective rotation of the pair of cam members; and
    a handle operatively connected to the pair of cam members and selectively rotating the pair of cam members so as to position the motor mount in the locked and unlocked positions.

13. The cotton candy machine of claim 12 wherein a portion of the handle is disposed above the spinner head when the motor mount is selectively positioned in the locked position.

14. The cotton candy machine of claim 12 further comprising a plurality of springs operatively connecting the base and the motor mount.

15. A cotton candy machine, comprising:
    a base;
    a spinner head for heating and spinning cotton candy from sugar introduced into the spinner head;
    a motor operatively connected to the spinner head for rotating the spinner head to direct molten sugar filaments radially outwardly from the spinner head;
    a motor mount operatively connected to the base and configured to support the motor, the motor mount being selectively positionable in a locked position and an unlocked position;
    a pair of spaced apart and opposing rotatable cam members configured to position the motor mount in the locked and unlocked positions in response to selective rotation of the pair of cam members; and
    a lever operatively connected to each of the pair of cam members and selectively rotating the pair of cam members so as to position the motor mount in the locked and unlocked positions.

\* \* \* \* \*

UNITED STATES PATENT AND TRADEMARK OFFICE
CERTIFICATE OF CORRECTION

| | | |
|---|---|---|
| PATENT NO. | : 7,479,002 B2 | Page 1 of 1 |
| APPLICATION NO. | : 11/622706 | |
| DATED | : January 20, 2009 | |
| INVENTOR(S) | : Ronald R. Weiss | |

It is certified that error appears in the above-identified patent and that said Letters Patent is hereby corrected as shown below:

In column 2, lines 58-59, change "in locked position and unlocked positions." to --in locked and unlocked positions.--.

In column 2, line 65, change "a pair spaced apart and opposing cam members." to --a pair of spaced apart and opposing cam members.--.

In column 5, line 14, change "intention of the applicants" to --intention of the applicant--.

In column 5, line 21-22, change "applicants' general inventive concept." to --applicant's general inventive concept.--.

In claim 7, column 6, line 6, change "pair of locking member" to --pair of locking members--.

Signed and Sealed this

Twenty-third Day of February, 2010

David J. Kappos
*Director of the United States Patent and Trademark Office*